United States Patent
Herczog

(10) Patent No.: US 11,129,007 B2
(45) Date of Patent: Sep. 21, 2021

(54) MONITORING APPARATUS, DEVICE MONITORING SYSTEM AND METHOD OF MONITORING A PLURALITY OF NETWORKED DEVICES

(71) Applicant: u-blox AG, Thalwil (CH)

(72) Inventor: Eugene Pascal Herczog, Cambridge (GB)

(73) Assignee: u-blox AG, Thalwil (CH)

( * ) Notice: Subject to any disclaimer, the term of this patent is extended or adjusted under 35 U.S.C. 154(b) by 248 days.

(21) Appl. No.: 15/849,809

(22) Filed: Dec. 21, 2017

(65) Prior Publication Data
US 2018/0191577 A1  Jul. 5, 2018

(30) Foreign Application Priority Data
Dec. 30, 2016  (EP) .................................. 16207653

(51) Int. Cl.
*H04W 4/70* (2018.01)
*H04L 29/08* (2006.01)
(Continued)

(52) U.S. Cl.
CPC ............... *H04W 4/70* (2018.02); *H04L 41/14* (2013.01); *H04L 63/1408* (2013.01);
(Continued)

(58) Field of Classification Search
CPC ... G06F 21/56; G06F 21/577; H04L 63/1416; H04L 63/1425; H04L 63/1408; H04L 63/08; H04L 63/1433; H04L 63/20
See application file for complete search history.

(56) References Cited

U.S. PATENT DOCUMENTS

| | | | |
|---|---|---|---|
| 8,676,149 B2 | 3/2014 | Beamish | |
| 2005/0120242 A1* | 6/2005 | Mayer | G06F 21/56 726/4 |

(Continued)

OTHER PUBLICATIONS

I. Murynets et al. "Anomaly Detection in Cellular Machine-to-Machine Communications" 2013 IEEE International Conference on Communications, ICC 2013.

*Primary Examiner* — Barbara B Anyan
(74) *Attorney, Agent, or Firm* — Finnegan, Henderson, Farabow, Garrett & Dunner LLP

(57) ABSTRACT

A monitoring apparatus (116) for a network of communications-enabled devices includes: a processing resource (200) arranged to support a data selection module (214) and a data analysis module (216). The apparatus (116) also includes a communications interface (218) operably coupled to the processing resource (200) and arranged to receive a plurality of data fragments. The plurality of data fragments each bear a respective device identifier and associated observation data, the plurality of data fragments respectively including a plurality of unique device identifiers. The data selection module (214) is arranged to read the respective identifiers of the plurality of data fragments and the associated observation data and to identify a set of the plurality of data fragments generated as a result of a common device characteristic. The data analysis module (216) is arranged to analyse the set of the plurality of data fragments identified by the data selection module in order to detect anomalous device activity.

19 Claims, 3 Drawing Sheets

(51) Int. Cl.

| | |
|---|---|
| *H04L 12/24* | (2006.01) |
| *H04W 12/122* | (2021.01) |
| *H04L 29/06* | (2006.01) |
| *H04W 8/24* | (2009.01) |
| *H04W 24/08* | (2009.01) |
| *G06F 8/65* | (2018.01) |
| *G06F 21/53* | (2013.01) |
| *H04W 12/65* | (2021.01) |
| *H04L 12/26* | (2006.01) |
| *G06F 11/07* | (2006.01) |

(52) U.S. Cl.
CPC ...... *H04L 63/1416* (2013.01); *H04L 63/1425* (2013.01); *H04L 69/329* (2013.01); *H04W 12/122* (2021.01); *G06F 8/65* (2013.01); *G06F 11/079* (2013.01); *G06F 21/53* (2013.01); *H04L 43/04* (2013.01); *H04L 43/065* (2013.01); *H04W 8/245* (2013.01); *H04W 12/65* (2021.01); *H04W 24/08* (2013.01)

(56) References Cited

U.S. PATENT DOCUMENTS

| | | | | |
|---|---|---|---|---|
| 2010/0154057 | A1* | 6/2010 | Ko | H04L 65/1006 726/23 |
| 2011/0301998 | A1* | 12/2011 | Talwar | H04L 41/12 705/7.26 |
| 2015/0067852 | A1* | 3/2015 | Cher | G06F 21/554 726/23 |
| 2016/0037366 | A1* | 2/2016 | Finkelstein | H04L 43/04 370/252 |
| 2016/0094578 | A1* | 3/2016 | McQuillan | H04L 63/1416 726/23 |
| 2016/0191563 | A1* | 6/2016 | Beauchesne | H04L 63/1425 726/25 |
| 2016/0203036 | A1* | 7/2016 | Mezic | G06F 11/079 714/819 |
| 2016/0234167 | A1* | 8/2016 | Engel | H04L 63/1408 |
| 2016/0247164 | A1* | 8/2016 | Salajegheh | H04L 43/065 |
| 2016/0283715 | A1* | 9/2016 | Duke | G06Q 20/308 |
| 2017/0149813 | A1* | 5/2017 | Wright | H04L 63/1425 |
| 2019/0079849 | A1* | 3/2019 | Korn | G06F 11/3457 |

* cited by examiner

MONITORING APPARATUS, DEVICE MONITORING SYSTEM AND METHOD OF MONITORING A PLURALITY OF NETWORKED DEVICES

PRIORITY STATEMENT

The present application hereby claims priority under 35 U.S.C. § 119 to European patent application number EP 16207653.3 filed Dec. 30, 2016, the entire contents of which are hereby incorporated herein by reference.

FIELD

The present invention relates to a monitoring apparatus of the type that, for example, comprises a data analysis module for analysing received data. The present invention also relates to a device monitoring system of the type that, for example, comprises a plurality of networked communications-enabled devices to be monitored. The present invention also relates to a method of monitoring a plurality of networked devices, the method being of the type that, for example, monitors data received from a plurality of networked communications-enabled devices.

BACKGROUND

An Internet of Things (IoT) system typically comprises a number of separate small, for example battery-powered, devices and a central unit. The devices are connected to the central unit via a communications channel, for example a wireless channel. In many cases, the wireless channel uses a standardised communication system, for example a Long-Term Evolution (LTE), 3G or IEEE 802.11 communications system. This means that the distance of the devices from the central unit can be considerable. The distance is not even limited by the range of the wireless channel, since it is possible to connect through, for example, a cloud service. Consequently, it is not always possible to determine visually, for example by site inspection, whether device tampering has occurred. Security is therefore critical for IoT devices. Remote monitoring is therefore desirable.

From a manufacturing perspective, devices are considered as being fit for purpose at the point of dispatch from a factory when the devices are pre-loaded with software to enable performance of the purpose for which the device was designed, and the devices start up as intended when powered-up during a test. However, this definition of being fit for purpose ignores security considerations, for example the above-mentioned vulnerability of remote devices to compromise by direct tampering on site. Also, in many cases the devices are at least partially similar and sometimes manufactured by the same manufacturer. Consequently, due to design similarities, a successful attack on one device implies that all other devices sharing the same vulnerability can be targets for attack. As such, a number of customers of the manufacturer of the compromised device may be at risk.

It therefore follows that a variety of techniques exist to exploit these vulnerabilities. In this regard, different networks apply different security measures and to differing degrees of rigour. As a consequence of such differences in security measures, a correlation between a vulnerability of an underlying hardware element of a group of devices associated with one network or end-to-end connections and the same hardware element employed by devices in another network or end-to-end connection may not be appreciated. Similarly, the underlying hardware element can be incorporated into a number of different devices deployed widely and the vulnerability, whilst known to one owner or manufacturer of a given device, may not be known to an owner or manufacturer of another device employing the same underlying hardware element. Additionally, security measures can be implemented by the central unit of a given network or even a third party and therefore the data available to the security measures implemented in the network is high level measurement data available at the application level only. As such, certain types of activity when perceived using data obtained at the application layer may appear to be normal activity when, in fact, the activity is anomalous, the anomalous nature of the activity only being detectable by analysis of data at a lower level, for example a camera device that is compromised and participating in a Distributed Denial of Service (DDoS) attack.

Vulnerabilities of an IoT-system can sometimes be detected by monitoring the traffic between the central unit and the devices or locally in the devices, which information can be used to advise the central unit of the detected threat. For example, U.S. Pat. No. 8,676,149 relates to a device that detects anomalies based on traffic data in that device and reports any anomalies to the central unit. "Anomaly Detection in Cellular Machine-to-Machine Communications" (Murynets et al., 2013 IEEE International Conference on Communications, ICC 20132013) discloses a study where machine-to-machine (M2M) traffic is analysed and anomalies are detected within a group of devices and/or single device from the traffic data of a large number of devices. The study was conducted offline based on traffic data of M2M devices in a network. However, devices that have been compromised at the application level using these known techniques are not always readily identifiable, especially in real time.

SUMMARY

According to a first aspect of the present invention, there is therefore provided a monitoring apparatus for a network of communications-enabled devices, the apparatus comprising: a processing resource arranged to support a data selection module and a data analysis module; a communications interface operably coupled to the processing resource and arranged to receive a plurality of data fragments; wherein the plurality of data fragments each bear a respective device identifier and associated observation data, the plurality of data fragments respectively comprising a plurality of unique device identifiers; the data selection module is arranged to read the respective identifiers of the plurality of data fragments and the associated observation data and to identify a set of the plurality of data fragments generated as a result of a common device characteristic; and the data analysis module is arranged to analyse the set of the plurality of data fragments identified by the data selection module in order to detect anomalous device activity with respect to a predetermined expected operational parameter.

The common device characteristic may relate to a device behaviour. The common device characteristic may be a device physical parameter.

The device physical parameter may be detectable by a peripheral device.

The peripheral device may be a measurement device independent of the processing resource. The peripheral device may be a temperature sensor. The peripheral device may be a GNSS receiver.

The common device characteristic may be a measurable parameter resulting from execution of a device application.

The processing resource may be arranged to generate an alert in response to detection of the anomalous device activity indicative unexpected device operation.

The processing resource may be arranged to initiate communication of a device update in response to the generation of the alert. The update may be a firmware update.

The data selection module may be arranged to identify another common device characteristic of the set of the plurality of data fragments; and the data analysis module may be arranged to analyse the set of the plurality of data fragments identified by the data selection module with respect to the another common device characteristic in order to increase confidence in the detection using the common device characteristic of the anomalous device activity.

The data selection module may be arranged to identify another set of the plurality of data fragments generated as a result of the common device characteristic; and the data analysis module may be arranged to analyse the another set of the plurality of data fragments identified by the data selection module in order to detect anomalous device activity.

The data fragment of the plurality of data fragments received may be encrypted. The data fragment may be received as compressed data. Indeed, the data fragment may be communicated using any suitable bandwidth optimisation technique. In this respect, the data fragment may represent a data differential or delta identifying a change in data.

According to a second aspect of the present invention, there is therefore provided a device monitoring system comprising: a monitoring apparatus as set forth above in relation to the first aspect of the invention; a plurality of communications-enabled devices capable of communicating with the monitoring apparatus.

The plurality of devices comprises: a device comprising a device processing resource supporting a protocol stack comprising an application layer; and the device processing resource may also support a monitoring module executing independently of the application layer.

The system may further comprise: a control entity associated with a group of the plurality of communications-enabled devices.

The monitoring apparatus may be arranged to communicate the alert to the control entity.

The plurality of devices may be arranged to communicate the plurality of data fragments to the monitoring apparatus.

The device processing resource may be arranged to execute the monitoring module in a sandbox supported by the processing resource.

The monitoring module may be arranged to communicate a number of the plurality of data fragments; and the number of the plurality of data fragments may comprise an identifier uniquely associated with the device.

The monitoring apparatus may comprise a register of monitored devices identifying devices of the plurality of devices to be monitored as part of a device monitoring subscription service.

The data selection module may be arranged to determine the group of devices by reference to the identities of the devices.

The nature of the observation data communicated by the monitoring module may be factory set.

According to a third aspect of the present invention, there is therefore provided an Internet of Things comprising the device monitoring system as set forth above in relation to the second aspect of the invention.

According to a fourth aspect of the present invention, there is therefore provided a method of monitoring a plurality of networked devices, the method comprising: receiving a plurality of data fragments from the plurality of devices, the plurality of data fragments comprising each bear a respective device identifier and associated observation data; reading the respective identifiers of the plurality of data fragments and the associated observation data in order to identify a set of the plurality of data fragments generated as a result of a common device characteristic; and analysing the set of the plurality of data fragments identified in order to detect anomalous device activity.

It is thus possible to provide an apparatus, system and method that supports device grouping for behavioural anomaly detection. By monitoring devices independently of application design, and at system levels below that which are visible to either the application, for example an application layer of a protocol stack, or an entity at an end-point of a communication with a given device, behaviours that are otherwise not detectable by normal end-user measurement techniques can be detected, including those that have no direct or immediate impact on the intended operation of the device but can nevertheless cause harm to other systems. Devices can therefore not only be monitored as attacks may be occurring, such as a sudden increase in invalid commands being presented to discover a weakness, but the flexible grouping of devices allows such detections to be made visible to owners of devices that are then deemed potentially vulnerable to the same attack before they occur. Likewise, the flexible grouping of devices also allows a reduction in elapsed time that would normally be needed to discern incorrect behaviour of a single device. Real-time detection of actual hacking attempts may also enable faster response. Furthermore, where potentially anomalous activity detected in a first group of devices is inconclusive as to whether the activity is anomalous, the activity can be cross-checked with activity detected in respect of a second group of devices, sharing a relevant hardware feature to the first group of devices, in order to determine whether a greater number of instances of a behaviour can be discovered than discernible with respect to the first group of devices, thereby obtaining confirmation of the anomalous activity.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
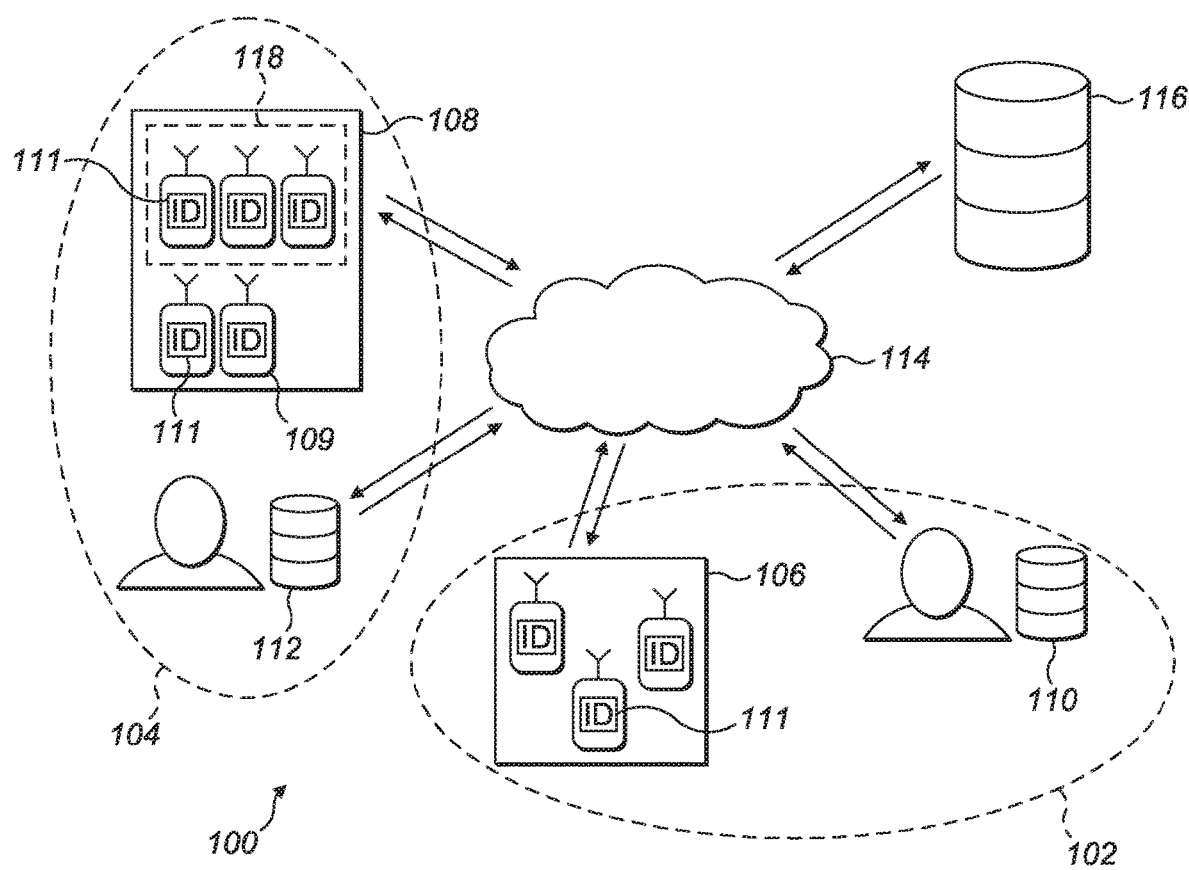
FIG. 1 is a schematic diagram of a device monitoring system constituting an embodiment of the invention.

Throughout the following description, identical reference numerals will be used to identify like parts.

Referring to FIG. 1, a device monitoring system 100 is provided to monitor a first IoT network 102 and a second IoT network 104. The first IoT network 102 comprises a first group or a first plurality of communications-enabled devices 106 and the second IoT network 104 comprises a second group or a second plurality of communications-enabled devices 108. Each device 109 of the first and second plurality of communications-enabled devices 106, 108 comprises a communications module 111 that is assigned a unique identifier (ID), for example at the time of manufacture. The devices of the first and second pluralities of devices 106, 108 can be of any desired type compatible with the first and second IoT networks, 102, 104, respectively, for example webcams, GNSS tracking units, vehicles, HVAC systems, and/or smart meters. The communications module 111 is any suitable module that enables communications with the devices 109. It should be appreciated that, for a given device, a manufacturer of the communications module 111 can be distinct from and independent of a manufacturer of the device 109. In this respect, the manufacturer of the communications module 111 can be a supplier to the manufacturer of the device 109. Furthermore, an owner, keeper and/or user of the device 109 can also be independent of and distinct from the manufacturer of the communications module 111 and/or the device 109.

The first IoT network 102 has a first control entity 110 and the second IoT network 104 has a second control entity 112. The first and second control entities 110, 112 are any technical resources provided that manage or oversee the operation or an aspect of operation of the first IoT network 102 and the second IoT network 104, respectively. The precise role of the first and second control entities 110, 112 depends on the purpose of the respective IoT network 102, 104. For example, an IoT network can be a network of asset tracking devices, a surveillance network of camera devices used to monitor assets, or a network of an Internet Service Provider (ISP) or infrastructure provider that has multiple customers, some of whom own communications-enabled devices. Typically, the control entity is implemented using a communications-enabled computing apparatus, for example a server. In this respect, the control entities 110, 112 can be servers of an entity that owns or manages the network with which a given control entity is associated, for example a server that collects data from a device 109 and/or supports data management functions, for example remote control of certain behaviours or functions.

A Wide Area Network (WAN), for example the Internet 114 is provided and the first plurality of communications-enabled devices 106 is capable of communicating with the first control entity 110 via the Internet 114. The second plurality of communications-enabled devices 108 is also capable of communicating with the second control entity 112 via the Internet 114.

A monitoring apparatus 116 is capable of communicating with the first plurality of communications-enabled devices 106, the second plurality of communications-enabled devices 108, the first control entity 110 and/or the second control entity 112 via the Internet 114.

The second plurality of communications-enabled devices 108 comprises a subset of communications enabled devices 118. In this example, the subset of communications-enabled devices 118 and the first plurality of communications-enabled devices 106 are implemented, for example, using the communications module 111, which is made by a same manufacturer.

Figure 2:
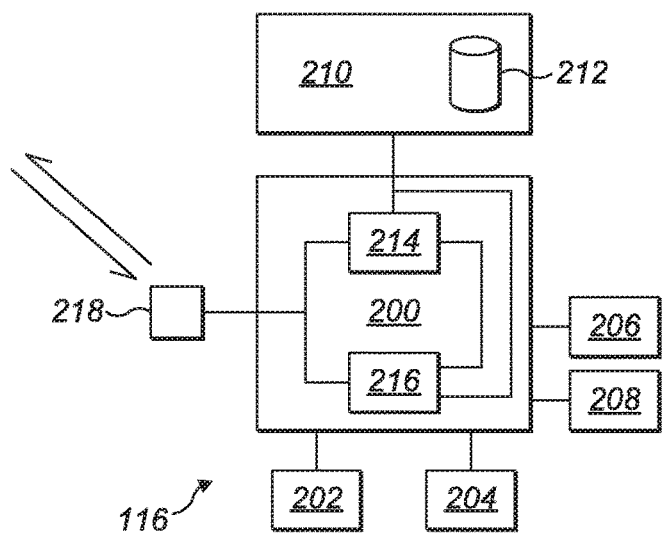
FIG. 2 is a schematic diagram of a monitoring apparatus of FIG. 1 and constituting another embodiment of the invention.

Turning to FIG. 2, the monitoring apparatus 116 is in this example implemented as a server and comprises a processing resource 200, the processing resource 200 being, in this example, a processor. The processing resource 200 is operably coupled to a volatile memory, for example a RAM 202, and a non-volatile memory, for example a digital memory 204. The processing resource 200 is also coupled to a keyboard 206 and a display 208. A storage device 210, for example a hard disc drive or a Solid State Drive (SSD), is also operably coupled to the processor 200, and comprises a database of device data 212. As a distinct database or as part of the database described above, subscription data can be stored, details of which will be described later herein, in the storage device 210. The skilled person should appreciate that the architecture of the monitoring apparatus 116 described above comprises other elements, but as such additional elements are not key to an understanding of the examples contained herein, they have not been described in detail for the sake of preserving conciseness and clarity of description.

In this example, the database of device data 212 stores device registration data comprising device type and identifiers of each individual device. The database of device data 212 also stores technical specification data, constituting predetermined expected operational parameters, associated with registered identifiers, which can comprise behaviour and/or physical parameters. For example, the behaviours can include frequencies of actions taken by the device 109, functions performed, such as kinds of outputs generated. The physical parameters can comprise physical characteristics of one or more physical element of the device 109, for example a normal operating temperature of a processing resource of the device, or physical attribute or performance parameter, for example data rate.

Depending upon the IoT network in which a given communications-enabled device resides, the devices are registered by the first control entity 110 or the second control entity 112. Alternatively, a manufacturer can register one or more communications-enabled devices with the monitoring apparatus 116. The manufacturer can be the manufacturer of the devices 109, the manufacturer of the communications module 111 or any other entity with an interest in monitoring behaviours associated with the devices to be monitored. Such an entity can be considered to be a subscriber. It should also be appreciated that where a manufacturer (of the device 109 or the communications module 111) wishes to subscribe to the monitoring service, the manufacturer can be responsible for making several products and the manufacturer can choose to register only a number of communications-enabled devices with the monitoring apparatus 116 where the different models of communications-enabled devices share common aspects or features.

In this example, the processing resource 200 supports a data selection module 214 and a data analysis module 216. The data selection module 214 is operably coupled to a communications interface 218 of the monitoring apparatus 116, and the storage device 210. The data selection module 214 is also capable of communicating with the data analysis module 216, the data analysis module 216 being operably coupled to the communications interface 218 of the monitoring apparatus 116 and the data store 210.

Figure 3:
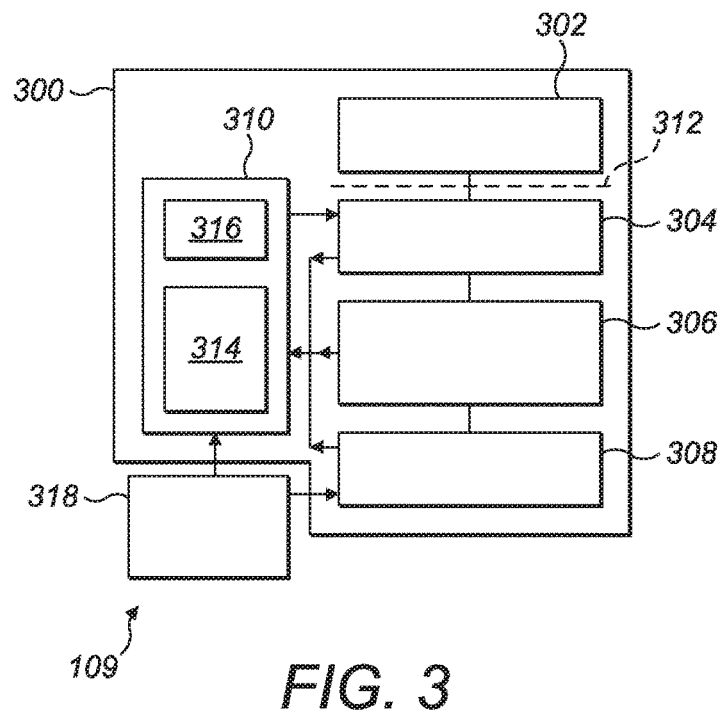
FIG. 3 is a schematic diagram of a communications-enabled device of FIG. 1.

Referring to FIG. 3, the device 109 comprises a device processing resource 300 that supports, in part, a protocol stack 302, 304, 306, 308. The protocol stack comprises, in this example, an application layer 302 capable of communicating with an application environment layer 304, the application environment layer 304 being capable of communicating with a modem layers 306 of the protocol stack. The protocol stack also comprises a hardware and drivers layer 308 capable of communicating with the modem layers 306. The modem layers 306 and the hardware and drivers layer 308 are used to communicate with the Internet 114 and, in this example, the monitoring apparatus 116. The communications module 111 supports some or all of the protocol stack, for example the modem layers 306 and part of the hardware and drivers layer 308, and a monitoring module 310.

The application layer 302 serves to host all the applications and functionalities of the device 109 that an owner of the device has installed on the device 109. The application layer 302 can also include applications provided by the manufacturer of the device 109 that relate to basic operations of the device 109.

The application environment layer 304 comprises, for example, an operating system for the device 109 and an Application Programming Interface (API). The modem layers 306 serve to prepare data received from higher layers to be transmitted in a required form and to prepare data received from lower layers to be received by higher layers in a required form, depending upon the communications technology that the device 109 uses for transmit data, for example in accordance with the LTE communications standard.

The hardware and drivers layer 308 comprises hardware required for transmission of the data in the required form from the modem layers 306, for example a Radio Frequency (RF) transmission stage and antenna(s).

The dashed line 312 indicates a border of the protocol stack below which, in this example, the manufacturer of the communications module 111 has access, but to which the owner of the device 109 (or other entity such as the control entity 110, 112) does not have access.

The monitoring module 310 is arranged to execute monitoring software 314 below the application layer 302, i.e. the dashed line 312, and comprises address information 316 for data that is collected by the monitoring module 310 for forwarding to the monitoring apparatus 116. The monitoring module 310 can be arranged, for example, to execute in a sandbox provided by the application environment layer 304, or to execute as a separate task supported by the application environment layer 304. The address information can be an IP address or any other type of address. An external device 318, for example a peripheral module or unit, is operably coupled to the monitoring module 310 and the hardware and drivers layer 308. Although, in this example, the external device 318 is depicted and described as being outside the device 109, it should be appreciated that, depending on configuration of the device 109, the external device 318 can be produced as part of the device. In this respect, the relative siting of the external device 318 should be understood as being, for example, with respect to the electronic circuitry used to support the protocol stack 302, 304, 306, 308, i.e. the external device 318 can be functionally independent of the hardware that supports the protocol stack 302, 304, 306, 308 and can be disposed within a housing (not shown) of the device 109 or external to the housing. Indeed, the "external" device 308 can even be part of the same integrated circuit that supports the protocol stack 302, 304, 306, 308. This external device 318 is, in this example, a temperature sensor or a GNSS receiver that provides data to the device 109 and its applications. It can also provide data to the monitoring software 314 by virtue of the connection with the monitoring module 310. Although, in this example, the external device 318 is connected to the hardware and drivers layer 308, the skilled person should appreciate that the data can be provided directly to other layers of the protocol stack, if required. In addition to being operably coupled to the external device 318, the monitoring module 310 is also operably coupled to the application environment layer 304, the modem layers 306 and the hardware and drivers layer 308. The monitoring module 310 is capable of receiving data assets originating from within the device 109, referred to as internal data assets, and from one or more sources external to the device 109, for example the external device 318, referred to as external data assets. The data assets constitute observation data. The data assets are used in order to detect anomalous device activity at a remote location, namely the monitoring apparatus 116. The anomalous device activity can relate to behaviour of a device and/or a physical parameter of the device, for example temperature (attempts are sometimes made to heat devices in order to compromise them). The anomalous device activity can include anomalous transmissions. Anomalous device activity can result from code being executed at the application layer 302, for example as a result of the device 109 being compromised or a malfunction.

Figure 4:
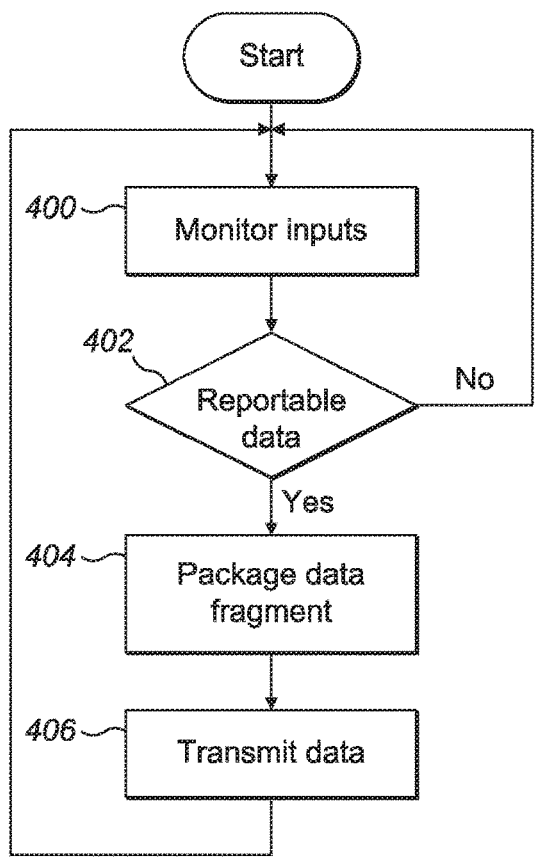
FIG. 4 is a flow diagram of a method of generating data fragments employed by the communications-enabled device of FIG. 3.

In operation (FIG. 4), the monitoring software 314 of the monitoring module 310 is arranged to monitor (Step 400) inputs to the monitoring module 310, namely internal and/or external data assets mentioned above by virtue of the coupling of the monitoring module 310 to the protocol stack and the coupling to the external device 318. In this regard, such acquisition of data can be accomplished through calling dedicated Application Programming Interfaces (APIs) to the application environment layer 304, the modem layer 306 and/or the hardware and drivers layer 308. Alternatively or additionally, the monitoring module 310 can be called by the application environment layer 304, the modem layer 306 and/or the hardware and drivers layer 308 to obtain the data assets. Such operations can be on an action/event-driven basis or a time basis depending upon the nature of the asset data.

The data assets originate from below the application layer 302 of the protocol stack. Examples of the data assets include, but are not limited to, temperature measurement values, GNSS location data, base station handoff data, IMEI data, wake-up time, internal die temperature, application environment memory usage, Central Processing Unit (CPU) idle time, and/or flash memory access utilisation. The type of data assets captured can be configured during manufacture. The monitoring software 314 analyses (Step 402) the data assets received in order to determine if any of the data assets conform to a selection criterion that is predefined by the manufacturer of the device 109 at the time of manufacture. In the event that a received data asset is determined to be of a kind that is required to be reported to the monitoring apparatus 116, the monitoring software 314 packages (Step 404) the data asset with a unique identifier of the device 109 and the address information 316 stored by the monitoring module 300. The packaging process can comprise encryption of the data asset, identifier and/or address information. Data compression can be applied as well, if desired, or any other bandwidth optimisation technique, for example communicating data differentials or deltas. The packaged data asset is then communicated to the application environment layer 304 for processing by the lower levels, i.e. below the dashed line 312, of the protocol stack. Alternatively, if no reportable data assets are currently received, the monitoring software 314 continues to monitor the data assets to identify any data assets that need to be reported to the monitoring apparatus 116. The packaged data asset received by the application environment layer 304 is processed by the protocol stack according to the design of the protocol stack and transmitted (Step 406) via the hardware and drivers layer 308 of the protocol stack.

As should be appreciated, each of the first and second IoT networks 102, 104 comprises a first plurality of communications-enabled devices 106 and a second plurality of communications-enabled devices 108, a number of the communications-enabled devices being subscribed to a device monitoring subscription service and so each communicates data fragments to the monitoring apparatus 116. The monitoring apparatus 116 therefore receives a plurality of data fragments.

Figure 5:
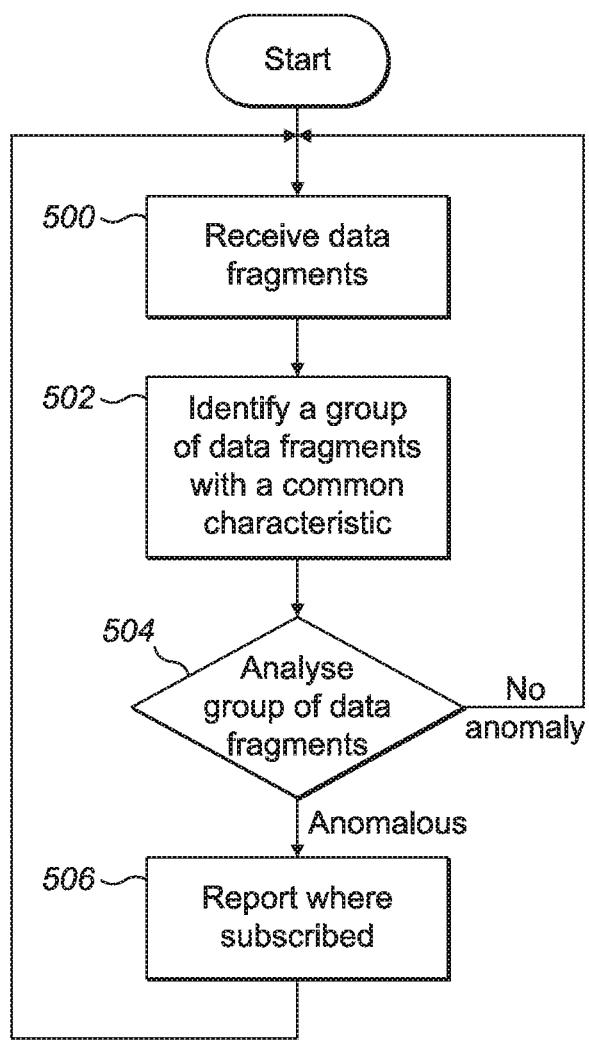
FIG. 5 is a flow diagram of a method of monitoring a plurality of networked devices employed by the monitoring apparatus of FIG. 2 and constituting a further embodiment of the invention.

Turning to FIG. 5, the data selection module 214 receives (Step 500) the plurality of data fragments mentioned above via the communications interface 218. The data selection module 214 then, with reference to the identifiers contained in the data fragments and the database of device data 212, attempts to identify (Step 502) one or more groups of data fragments reflecting origination from devices sharing a common device characteristic. In this regard, the technical specification data stored by the database of device data 212 is accessed by the data selection module 214 by reference to, for example, the identifiers contained in the data fragments in order to the identify the common device characteristic. The common device characteristic is, in this example, a wake-up function. Data fragments originating from devices of a certain class, for example smart meters, that also have a wake-up function are, for example, selected as the group of data fragments. Hence, it can also be seen that more than one common device characteristic, in this example another common device characteristic, can be used as the basis of data fragment selection. Once a plurality of data fragments sharing one or more common device characteristics has been identified, the data selection module 214 communicates the group of data fragments to the data analysis module 216 in order to analyse the group of data fragments in order to identify (Step 504) any anomalous behaviour of the communications-enabled devices in the first IoT network 102 and/or the second IoT network 104, i.e. the approach to grouping of data fragments can be network agnostic. In the case of devices of a certain class having the wake-up function, a normal periodicity of wake-up can be, for example, every 2 hours. The data analysis module 216 accesses the database of device data 212 in order to determine a normal periodicity. However, in other embodiments, such technical specification data can be configured during registration of the device 109 with the monitoring apparatus 116. This information is then used by the data analysis module 216 in order to determine whether the plurality of data fragments constitute reports of wake-ups being performed with a periodicity that is within normal operating parameters. If, for example, the data assets obtained from the group of data fragments indicate that the wake-up periodicity is not in accordance with the normal operating periodicity, for example a time period considerably less than every two hours, this is considered anomalous behaviour by the data analysis module 216. In this respect, statistical analysis of the data asset of the group of data fragments can be performed in order to determine whether a statistically significant number of the devices generating the data fragments are not operating in accordance with expected operating parameters. Where a statistically significant number of devices are found to be operating anomalously, this can suggest that the devices have been compromised. Additionally or alternatively, a small number of devices determined not to be operating in accordance with normal operating parameters can suggest malfunction of one or more devices. In some examples, one or more additional common device characteristic can be analysed by the data analysis module 216 in order to obtain increased confidence in the detection using the common device characteristic of the anomalous device activity. In some examples, the common device characteristic can be used to identify more than one group of data fragments, each group respectively behaving anomalously. In this regard, each group can nevertheless share a common feature, for example an underlying hardware element, such as the communications module 111, such that the data fragments of each group can also conform to another, common, grouping. As such, analysis of the data fragments of the common grouping can reveal anomalous behaviour exhibited by both groups and hence different devices, for example different classes of devices, such as smart meters and smart street lights, thereby revealing anomalous behaviour that would not necessarily be detectable by analysing independently data fragments from separate groups of data fragments.

In some examples, the criterion or criteria used by the data analysis module 216 to analyse a given group of data fragments can be configurable. In this respect, the criteria or criterion can be set by, for example, one of the control entities 110, 112 or any other appropriate entity such as the monitoring apparatus 116 unilaterally in relation to, for example, the technical specification data. An adjustment request can, in such an example, be communicated from the appropriate entity to the monitoring apparatus 116. In one example, the adjustment of the criterion or criteria can be as a result of environmental conditions associated with the device 109, which can lead to an unacceptably high number of false alarms. For example, where a number of the devices 109 are located in an environment with a high ambient temperature, a temperature parameter that if exceeded would normally suggest anomalous activity can be increased to take into account the ambient temperature, for example as a result of a warm climate and/or indoor use. Additionally or alternatively, in the event that analysis of a group of data fragments in relation to a given criterion or criteria results in an unacceptably high number of false alarms, the criteria or criterion, constituting for example a threshold or thresholds, can be adjusted to reduce the number of false alarms. This can be necessary for reason only that the number of false alarms is unacceptably high, no other, for example environmental, reason being identifiable.

In the event that one or more of the devices are subscribed devices, which the data analysis module 216 determines by reference to the subscription data stored by the database 212, the data analysis module 216 responds to the detection of anomalous device behaviour by generating an alert indicative of one or more devices operating in an unexpected manner. The alert can then be communicated (Step 506) to an entity that registered the device 109 with the monitoring apparatus 116, for example, a subscriber to the service, such as a manufacturer of the devices, an actual owner of the device 109, a manufacturer of the communications module 111 and/or a control entity associated with the devices that are operating anomalously.

The response to the alert sent can depend upon the policy of the recipient of the alert. For example, one manufacturer can investigate the anomalous behaviour further and determine that a device update, for example a software update, such as a Firmware Over The Air (FOTA) update, needs to be sent to one or more devices.

While specific examples of the invention have been described above, the skilled person will appreciate that many equivalent modifications and variations are possible. For example, although the above examples have been described in the context of monitoring wake-up behaviour of communications-enabled devices, other activities can form the basis of detection of anomalous behaviour, for example monitoring bombardment of a device with invalid AT commands.

It should also be appreciated that while the above examples have been described in the context of IoT networks, the skilled person should appreciate that the examples are applicable to other networks of communications-enabled devices.

It should further be appreciated that whilst the examples set forth herein are described in the context of analysis being performed by the communications module 111, the device processing resource of the devices 109 described herein that supports the monitoring module 310 can embrace processing for monitoring purposes deeper within the device 109, for example a component or element of the communications module 111 or an element nested further still. In such circumstances, the monitoring module 310 supported by the deeper element would have access to activity occurring below the dashed line 312 with respect to the protocol stack. In this regard, by way of example, the monitoring module 310 can be supported by a processor of a Subscriber Identity Module (SIM), which would constitute part of the device processing resource mentioned above.

Accordingly, the exemplary embodiments of the invention set forth above are considered to be illustrative and not limiting. Various changes to the described embodiments may be made without departing from the spirit and scope of the invention.

The apparatus and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

What is claimed is:

1. A monitoring apparatus for a network of communication-enabled devices, the apparatus comprising:
a data selection module;
a data analysis module;
a processing resource arranged to support the data selection module and the data analysis module; and
a communication interface operably coupled to the processing resource and arranged to receive a plurality of data fragments, the data fragments comprising:
first and second device identifiers, the first and second device identifiers being device identifiers of the communication-enabled devices; and
associated observation data,
wherein:
the data selection module is arranged to:
read the first device identifiers and the observation data in the data fragments; and
identify a common device characteristic in a subset of the data fragments, the common device characteristic comprising an operating temperature of a processing resource of the apparatus; and
the data analysis module is arranged to:
analyze the subset of the data fragments; and
based on the analysis, detect an anomalous device activity with respect to a predetermined expected operational parameter.

2. The apparatus according to claim 1, wherein the common device characteristic relates to a device behavior.

3. The apparatus according to claim 1, wherein the operating temperature is an operating temperature detectable by a peripheral device.

4. The apparatus according to claim 1, wherein the common device characteristic is a measurable parameter resulting from execution of a device application.

5. The apparatus according to claim 1, wherein the processing resource is arranged to generate an alert indicative of an unexpected device operation in response to detection of the anomalous device activity.

6. The apparatus according to claim 5, wherein the processing resource is arranged to initiate communication of a device update in response to the generation of the alert.

7. The apparatus according to claim 1, wherein:
the common device characteristic is a first common device characteristic;
the data selection module is arranged to identify a second common device characteristic in the subset of the data fragments; and
the data analysis module is arranged to analyze the subset of the data fragments with respect to the second common device characteristic in order so as to increase confidence in the detection of the anomalous device activity.

8. The apparatus according to claim 1, wherein:
the subset of the data fragments is a first subset of the data fragments;
analyzing the subset of the data fragments comprises a first analysis;
the data selection module is arranged to identify a second subset of the data fragments based on the common device characteristic; and
the data analysis module is arranged to:
perform a second analysis comprising analyzing the second subset of the data fragments; and
detect the anomalous device activity based on the second analysis.

9. A device monitoring system comprising:
a monitoring apparatus comprising:
a data selection module;
a data analysis module;
a processing resource arranged to support the data selection module and the data analysis module; and
a communication interface operably coupled to the processing resource and arranged to receive a plurality of data fragments, the data fragments comprising:
first and second device identifiers, the first and second device identifiers being device identifiers of a plurality of communication-enabled devices, the communication-enabled devices comprising communication apparatus for communicating with the monitoring apparatus; and
associated observation data, wherein:
the data selection module is arranged to:
read the first device identifiers and the observation data in the data fragments; and
identify a common device characteristic in a subset of the data fragments, the common device characteristic comprising an operating temperature of a processing resource of the monitoring apparatus; and
the data analysis module is arranged to:
analyze the subset of the data fragments; and
based on the analysis, detect an anomalous device activity with respect to a predetermined expected operational parameter.

10. The system according to claim 9, wherein the communication-enabled devices each comprise a device processing resource supporting:
a protocol stack comprising an application layer; and
a monitoring module executing independently of the application layer.

11. The system according to claim 9, further comprising:
a control entity associated with a group of the communication-enabled devices.

12. The system according to claim 11, wherein the monitoring apparatus is arranged to communicate the alert to the control entity.

13. The system according to claim 9, wherein the communication-enabled devices are arranged to communicate the data fragments to the monitoring apparatus.

14. The system according to claim 10, wherein the device processing resource is arranged to execute the monitoring module in a sandbox supported by the processing resource.

15. The system according to claim 10, wherein:
the monitoring module is arranged to communicate a number of the data fragments; and
the number of the data fragments comprise an identifier uniquely associated with the device.

16. The system according to claim 9, wherein the monitoring apparatus comprises a register identifying monitored devices among the communication-enabled devices as part of a device monitoring subscription service.

17. The system according to claim 11, wherein the data selection module is arranged to determine the group of the communication-enabled devices by reference to the first device identifiers in the data fragments.

18. A device monitoring system for an Internet of Things, comprising:
a monitoring apparatus comprising:
a data selection module;
a data analysis module;
a processing resource arranged to support the data selection module and the data analysis module; and
a communication interface operably coupled to the processing resource and arranged to receive a plurality of data fragments, the data fragments comprising:
first and second device identifiers, the first and second device identifiers being device identifiers of a plurality of communication-enabled devices, the communication-enabled devices comprising communication apparatus for communicating with the monitoring apparatus; and
associated observation data,
wherein:
the data selection module is arranged to:
read the first device identifiers and the observation data in the data fragments; and
identify a common device characteristic in a subset of the data fragments, the common device characteristic comprising an operating temperature of a processing resource of the monitoring apparatus; and
the data analysis module is arranged to:
analyze the subset of the data fragments; and
based on the analysis, detect an anomalous device activity with respect to a predetermined expected operational parameter.

19. A method of monitoring a plurality of networked devices, the method comprising:
receiving a plurality of data fragments from the networked devices, the data fragments comprising device identifiers of the networked devices, and associated observation data;
reading the device identifiers and the observation data in the data fragments;
identifying a common device characteristic in a subset of the data fragments, the common device characteristic comprising an operating temperature of a processing resource of an apparatus; and
analyzing the subset of the data fragments; and
based on the analysis, detecting an anomalous device activity with respect to a predetermined expected operational parameter.

* * * * *